(12) United States Patent
Clarke

(10) Patent No.: US 10,842,270 B2
(45) Date of Patent: Nov. 24, 2020

(54) SAFETY DEVICES FOR STORAGE RACKS AND METHODS OF PROTECTING OBJECTS POSITIONED ON STORAGE RACKS

(71) Applicant: International Cordage East, Ltd., Colchester, CT (US)

(72) Inventor: Brian S. Clarke, St Petersburg, FL (US)

(73) Assignee: INTERNATIONAL CORDAGE EAST, LTD., Colchester, CT (US)

( * ) Notice: Subject to any disclaimer, the term of this patent is extended or adjusted under 35 U.S.C. 154(b) by 0 days.

(21) Appl. No.: 16/583,712

(22) Filed: Sep. 26, 2019

(65) Prior Publication Data
US 2020/0093268 A1    Mar. 26, 2020

Related U.S. Application Data

(60) Provisional application No. 62/736,840, filed on Sep. 26, 2018.

(51) Int. Cl.
*A47B 97/00* (2006.01)
*B65G 1/02* (2006.01)

(52) U.S. Cl.
CPC .............. *A47B 97/00* (2013.01); *B65G 1/02* (2013.01); *B65G 2207/40* (2013.01)

(58) Field of Classification Search
CPC .. B65G 2207/40; B65G 1/02; B65G 2207/20; A47B 97/00; A47B 96/00
See application file for complete search history.

(56) References Cited

U.S. PATENT DOCUMENTS

| | | | |
|---|---|---|---|
| 844,687 A * | 2/1907 | Miller et al. | A47F 5/10 211/175 |
| 2,553,980 A * | 5/1951 | Ostrander | A01K 73/12 43/14 |
| 3,527,319 A * | 9/1970 | Pedley | A62B 1/22 182/139 |
| 4,981,225 A * | 1/1991 | Cole | B65G 1/02 211/180 |
| 4,982,813 A * | 1/1991 | Starr | A62B 1/22 182/138 |
| 4,986,389 A * | 1/1991 | Halligan, Sr. | E04G 21/28 182/138 |

(Continued)

FOREIGN PATENT DOCUMENTS

DE          29704011 U1 *  7/1997  ............. A47B 96/00

*Primary Examiner* — Stanton L Krycinski
(74) *Attorney, Agent, or Firm* — Cantor Colburn LLP

(57) ABSTRACT

A safety device for preventing objects from falling out of a storage rack is provided. The safety device includes four mounting brackets configured to be coupled to a pair of vertical members defining the storage rack, a pair of horizontally disposed top and bottom guide cables for stretching between a corresponding pair of mounting brackets of the four mounting brackets coupled to the pair of vertical members, and a pair of vertical slide bars for slidably mounting to the top and bottom guide cables at opposite left and right sides at a front of one bay in the storage rack. A curtain netting is attached at left and right edges thereof to respective ones of the pair of the vertical slide bars and to the top and bottom guide cables. Storage racks and methods of protecting objects stored on storage racks are also described.

19 Claims, 11 Drawing Sheets

(56) References Cited

U.S. PATENT DOCUMENTS

| | | | | |
|---|---|---|---|---|
| 5,170,829 A * | 12/1992 | Duncan | B65G 1/02 | 160/194 |
| 5,573,125 A * | 11/1996 | Denny | A47B 96/00 | 160/84.01 |
| 5,673,769 A * | 10/1997 | Rexroad | A62B 1/22 | 182/138 |
| 5,787,955 A * | 8/1998 | Dargie | E02D 29/12 | 160/368.1 |
| 5,984,121 A * | 11/1999 | Cole | B65G 1/02 | 211/183 |
| 6,068,085 A * | 5/2000 | Denny | A62B 1/22 | 182/138 |
| 6,098,750 A * | 8/2000 | Reynolds | A62B 1/22 | 182/112 |
| 6,116,438 A * | 9/2000 | Lovett | B65G 1/02 | 211/14 |
| 6,186,274 B1 * | 2/2001 | Reynolds | A62B 1/22 | 182/112 |
| 6,585,122 B2 | 7/2003 | Calleja | | |
| 6,609,621 B2 * | 8/2003 | Denny | A47B 47/021 | 211/180 |
| 6,619,490 B2 * | 9/2003 | Calleja | A47F 5/01 | 211/180 |
| 6,722,512 B2 * | 4/2004 | Scully | A47F 5/13 | 211/175 |
| 6,805,187 B2 * | 10/2004 | Padiak | A47B 96/00 | 160/214 |
| 6,938,785 B2 * | 9/2005 | Denny | A47F 13/00 | 211/183 |
| 7,014,053 B2 * | 3/2006 | Calleja | A47F 5/01 | 182/138 |
| 7,191,907 B2 * | 3/2007 | Conway | A47B 47/027 | 182/138 |
| 8,672,092 B2 * | 3/2014 | Black | A63J 3/00 | 182/150 |
| 2004/0182809 A1 * | 9/2004 | Calleja | A47F 5/132 | 211/180 |
| 2005/0000928 A1 * | 1/2005 | Calleja | F16P 1/02 | 211/183 |
| 2005/0103736 A1 * | 5/2005 | Calleja | A47B 96/00 | 211/189 |
| 2008/0272675 A1 * | 11/2008 | Denny | A47B 96/00 | 312/210 |

* cited by examiner

SAFETY DEVICES FOR STORAGE RACKS AND METHODS OF PROTECTING OBJECTS POSITIONED ON STORAGE RACKS

CROSS-REFERENCE TO RELATED APPLICATIONS

This application claims priority to U.S. Provisional Application No. 62/736,840, filed on Sep. 26, 2018, the contents of which is incorporated herein by reference in its entirety.

BACKGROUND

The present disclosure relates generally to material storage, and more particularly to safeguarding objects and materials in overhead storage and limiting injury risk to individuals in proximity to objects and materials in overhead storage.

Material-handling systems, such as employed in warehouses, distribution centers, and manufacturing environments, commonly employ storage racks to store objects until the stored objects are required or desired. The storage racks generally include two or more shelves stacked one above the other with a vertical gap defined between vertically adjacent shelves. The vertical gap defined between adjacent shelves typically provides access to the lower of the stacked shelves, allowing objects to be positioned on the lower shelf and/or removed from the lower shelf, as required. The objects themselves in turn may be stacked individually on the lower shelf, e.g., as break bulk, or unitized by stacking objects on a pallet or skid. Unitization allows multiple objects stored on storage racks to be positioned and/or removed from the shelf using a material handling device like a forklift.

One challenge to conventional material-handling systems is limiting the risk of injury to persons in proximity to storage racks and objects positioned overhead on storage racks. Specifically, objects in overhead storage can be inadvertently knocked off the shelf during placement and/or retrieval of the object and/or during placement and/or retrieval of neighboring objects(s) from the storage rack. Objects in overhead storage can also fall in the event the storage rack itself is disturbed, such as if bumped by a material handling device or during seismic events. Objects in overhead storage can fall on their own accord, such as due to instability resultant from the placement of the object on the storage rack.

Various strategies can be employed to limit the risk of injury around storage racks and damage to objects in overhead storage. For example, some warehouse and retail stores limit access to the aisles around storage racks when objects are being placed and/or retrieved from a storage rack. Restraints like tie downs and straps can also be employed to secure the objects themselves to overhead shelves and/or pallets or skids. While generally acceptable for its intended purpose, restricting access to storage racks may be impractical due to the location of certain storage racks, and the employment of restraints is impractical due to the time required to emplace and/or remove the restraints from an object during placement or retrieval.

BRIEF DESCRIPTION

A safety device for preventing objects from falling out of a storage rack is provided. The safety device includes four mounting brackets configured to be coupled to a pair of vertical members defining the storage rack, a pair of horizontally disposed top and bottom guide cables for stretching between a corresponding pair of mounting brackets of the four mounting brackets coupled to the pair of vertical members, and a pair of vertical slide bars for slidably mounting to the top and bottom guide cables at opposite left and right sides at a front of one bay in the storage rack. A curtain netting is attached at left and right edges thereof to respective ones of the pair of the vertical slide bars and to the top and bottom guide cables.

In addition to one or more of the features described above, or as an alternative, further examples of the safety device may include that the curtain netting is attached to the top and bottom guide cables via carabiners while left and right edges defining the curtain netting are weaved onto respective vertical slide bars of the pair of vertical slide bars for a sliding curtain-hanger attachment between the top and bottom guide cables such that the curtain netting can be horizontally separated from each of the opposing pair of vertical members defining the storage rack.

In addition to one or more of the features described above, or as an alternative, further examples of the safety device may include that the curtain netting is weaved onto each of the pair of vertical slide bars by weaving the corresponding vertical slide bar through every other mesh defining the curtain netting.

In addition to one or more of the features described above, or as an alternative, further examples of the safety device may include that each of the vertical slide bars terminates in a hooked section for coupling to the top and bottom guide cables.

In addition to one or more of the features described above, or as an alternative, further examples of the safety device may include that each of the vertical slide bars comprises two separable bars for adjusting a length of each of the vertical slide bars to fit different-sized storage rack openings.

In addition to one or more of the features described above, or as an alternative, further examples of the safety device may include another mounting bracket configured to be coupled to each of the pair of vertical members defining the storage rack, the another mounting bracket having a first tube affixed thereto; a second tube mounted to each of the vertical slide bars; and a J-hook slidably attachable to both the first and second tubes to prevent sliding of the curtain netting from the corresponding vertical member defining the storage rack.

In addition to one or more of the features described above, or as an alternative, further examples of the safety device may include that, when the J-hook is detached from the first tube, the corresponding vertical slide bar and curtain netting can freely slide along the top and bottom guide cables.

In addition to one or more of the features described above, or as an alternative, further examples of the safety device may include that the J-hook has a terminal end configured to be received within the first tube, a shank extending from the terminal end and configured to be slidably received within the second tube, and a split annulus seated in the shank and slidably fixing the shank of the J-hook within the second tube.

In addition to one or more of the features described above, or as an alternative, further examples of the safety device may include a pair of vertical extensions extending from an upper pair of the four mounting brackets to support the top guide cable at a location above terminations of the pair of vertical members of the storage rack.

In addition to one or more of the features described above, or as an alternative, further examples of the safety device may include that the curtain netting is a first curtain netting and that the safety device includes a second curtain netting, the second curtain netting is attached to the top and bottom guide cables and is horizontally spaced apart from the first curtain netting by a vertical member between each vertical member of the pair of vertical members of the storage rack.

In addition to one or more of the features described above, or as an alternative, further examples of the safety device may include another pair of mounting brackets configured to be coupled to a pair of vertical members defining the storage rack vertically between the four mounting, an upper pair of horizontally disposed top and bottom guide cables for stretching between a corresponding pair of mounting brackets of the mounting brackets coupled to the pair of vertical members, an upper pair of vertical slide bars for slidably mounting to the upper top and bottom guide cables at opposite left and right sides at a front of one bay in the storage rack, and a second curtain netting attached at left and right edges thereof to respective ones of the upper pair of the vertical slide bars and to the upper top and bottom guide cables.

In addition to one or more of the features described above, or as an alternative, further examples of the safety device may include that the safety device is one of a warehouse safety device, a distribution center safety device, and retail store safety device.

A storage rack is provided. The storage rack includes a first vertical member, a second vertical member horizontally spaced from the first vertical member, a shelf coupling the second vertical member to the first vertical member to define one bay in the storage rack, and a warehouse storage device. The safety device includes four mounting brackets coupled to the first vertical member and the second vertical member, a pair of horizontally disposed top and bottom guide cables stretched between pairs of mounting brackets of the four mounting brackets coupled to the first and second vertical members, a pair of vertical slide bars slidably mounted to the top and bottom guide cables at opposite left and right sides at a front of the one bay in the storage rack, and a curtain netting attached at left and right edges thereof to respective ones of the pair of the vertical slide bars and to the top and bottom guide cables.

In addition to one or more of the features described above, or as an alternative, further examples of the storage rack may include that the curtain netting of the safety device is attached to the top and bottom guide cables via carabiners while left and right edges defining the curtain netting are weaved onto respective vertical slide bars of the pair of vertical slide bars for a sliding curtain-hanger attachment between the top and bottom guide cables such that the curtain netting can be horizontally separated from each of the opposing pair of vertical members defining the storage rack.

In addition to one or more of the features described above, or as an alternative, further examples of the storage rack may include the curtain netting of the safety device is weaved onto each of the pair of vertical slide bars by weaving the corresponding vertical slide bar through every other mesh defining the curtain netting.

In addition to one or more of the features described above, or as an alternative, further examples of the storage rack may include that each of the vertical slide bars of the safety device terminates in a hooked section for coupling to the top and bottom guide cables.

In addition to one or more of the features described above, or as an alternative, further examples of the storage rack may include each of the vertical slide bars of the safety device comprises two separable bars for adjusting a length of each of the vertical slide bars to fit different-sized storage rack openings.

In addition to one or more of the features described above, or as an alternative, further examples of the storage rack may include another mounting bracket coupled to each of the first vertical member and the second vertical member, the another mounting bracket having a first tube affixed thereto; a second tube mounted to each of the vertical slide bars; and a J-hook slidably attachable to both the first and second tubes, the J-hook preventing sliding of the curtain netting from the corresponding vertical member defining the storage rack when attached to the first tube, the corresponding vertical slide bar and curtain netting freely slidable along the top and bottom guide cables when the J-hook of the safety device is detached from the first tube.

A method of protecting objects stored on a storage rack is additionally provided. The method includes, at a storage rack as described above, coupling four mounting brackets to the first and second vertical members, stretching a pair of horizontally disposed top and bottom guide cables between corresponding pairs of mounting brackets of the four mounting brackets, slidably mounting a pair of vertical slide bars at opposite left and right sides at a front of one bay in the storage rack, and slidably attaching a curtain netting at left and right edges thereof to respective ones of the pair of vertical slide bars and to the top and bottom guide cables.

In addition to one or more of the features described above, or as an alternative, further examples of the method may include coupling another mounting bracket to each of the first and second vertical members, the another mounting bracket having a first tube affixed thereto, a second tube mounted to each of the vertical slide bars and a J-hook slidably attached to the second tubes; slidably attaching the J-hook to the first tube and thereby preventing the sliding of the curtain netting from the corresponding vertical member defining the storage rack; and slidably detaching the J-hook from the first tube such the corresponding vertical slide bar and curtain netting can freely slide along the top and bottom guide cables.

BRIEF DESCRIPTION OF THE DRAWINGS

The following descriptions should not be considered limiting in any way. With reference to the accompanying drawings, like elements are numbered alike.

DESCRIPTION

Figure 1:
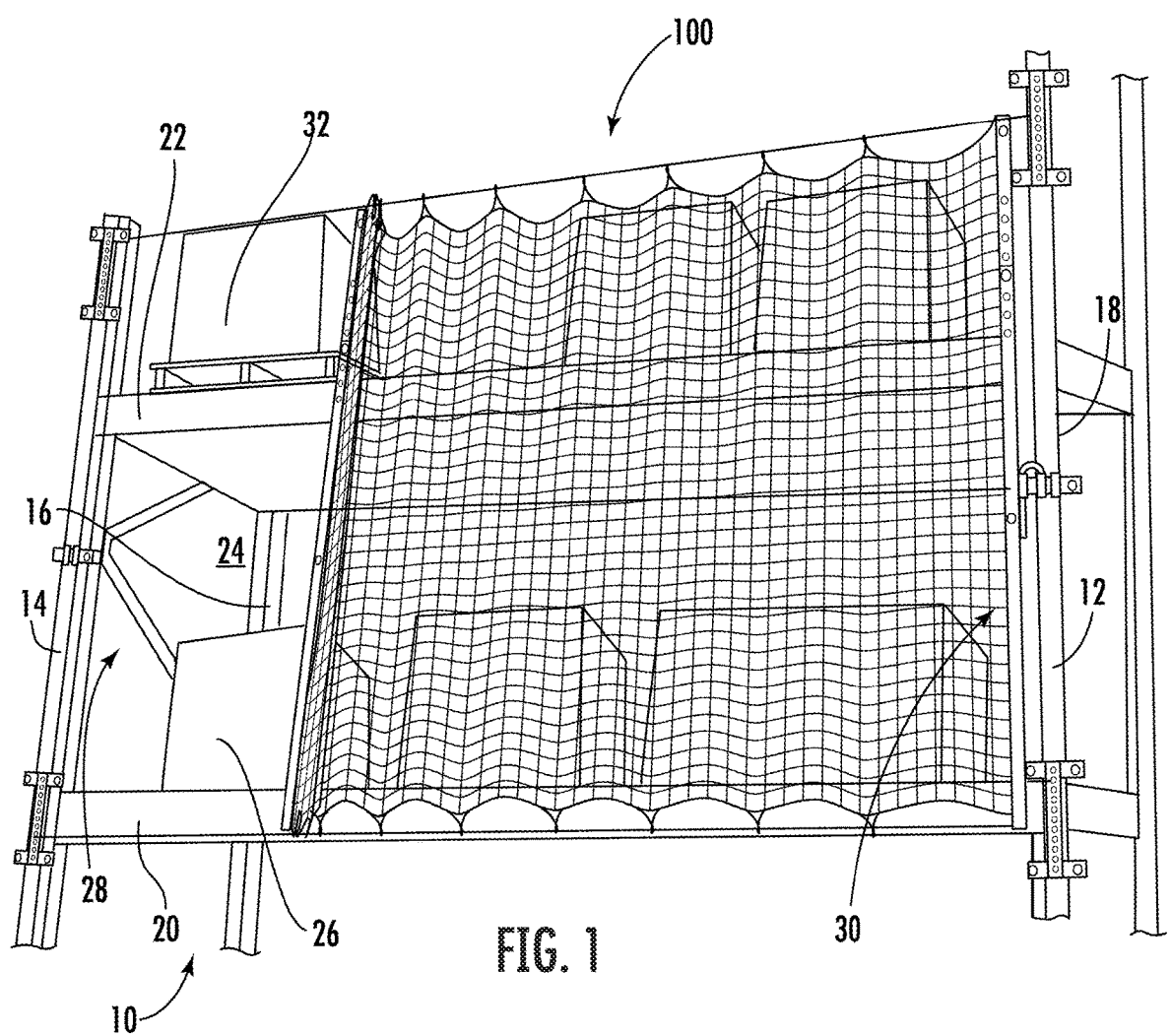
FIG. 1 is a front view of a safety device constructed in accordance with the present disclosure, showing the safety device coupled to a first vertical member and a second vertical member of a storage rack.

Reference will now be made to the drawings wherein like reference numerals identify similar structural features or aspects of the subject disclosure. For purposes of explanation and illustration, and not limitation, a partial view of an example of a safety device constructed in accordance with the disclosure is shown in FIG. 1 and is designated generally by reference character 100. Other embodiments of safety devices in accordance with the present disclosure, or aspects thereof, are provided in FIGS. 2-12, as will be described. The safety devices described herein can be used to provide to prevent objects from falling from storage racks, such from overhead shelves in warehouses and distribution centers or in manufacturing environments, though the safety devices described herein are not limited to any particular type of facility or type of storage rack in general.

Referring to FIG. 1, a storage rack 10 with the safety device 100 coupled to the storage rack 10 is shown. The storage rack 10 includes a plurality of vertical members, e.g., a first vertical member 12, a second vertical member 14, a third vertical member 16, and a fourth vertical member 18. The storage rack 10 also includes a plurality of shelves, e.g., a first shelf 20 and a second shelf 22. Although the storage rack 10 is shown with four (4) vertical members and two (2) storage shelves it is to be understood and appreciated that storage racks having fewer or more than four (4) vertical members and/or two (2) shelves can also benefit from the present disclosure.

The first vertical member 12 stands on an end and extends vertically therefrom with respect to gravity. The second vertical member 14 is similar to the first vertical member 12 and is additionally horizontally spaced apart from the first vertical member 12 and coupled thereto by the first shelf 20 and the second shelf 22. The third vertical member 16 and the fourth vertical member 18 are similar to the first vertical member 12 and the second vertical member 14, are coupled to one another and to the first vertical member 12 and the second vertical member 14 by the first shelf 20 and the second shelf 22, and are additionally spaced apart from the first vertical member 12 and the second vertical member 14 by depths of the first shelf 20 and the second shelf 22. The fourth vertical member 18 is additionally horizontally spaced apart from the third vertical member 16 by the first shelf 20 and the second shelf 22.

The storage rack 10 defines a bay 24 between the first shelf 20 and the second shelf 22. The bay 24 extends between a left side 28, adjacent to the second vertical member 14 and fourth vertical member 18, and a right side 30, adjacent to the first vertical member 12 and the third vertical member 16. Objects, e.g., individually stacked objects 26 and palletized objects 32, are positioned in the bay 24 and supported therein by the first shelf 20 of the storage rack 10.

As will be appreciated by those of skill in the art in view of the present disclosure, objects supported on storage racks, e.g., the individually stacked objects 26 and/or the palletized objects 32, positioned on the storage rack 10 can sometimes fall from the storage rack 10. For example, objects may fall during placement and/or retrieval from an overhead shelf. Objects can also be dislodged during placement and/or retrieval of other objects from the shelves of storage rack. Further, objects may fall when a storage rack is disturbed such as in the event that the storage rack is bumped by a piece of material handling equipment and/or during seismic event. To limit the hazard potentially presented to persons in proximity to the storage rack 10 and/or damage from objects falling from the storage rack 10 the safety device 100 is coupled to the storage rack 10.

Figure 2:
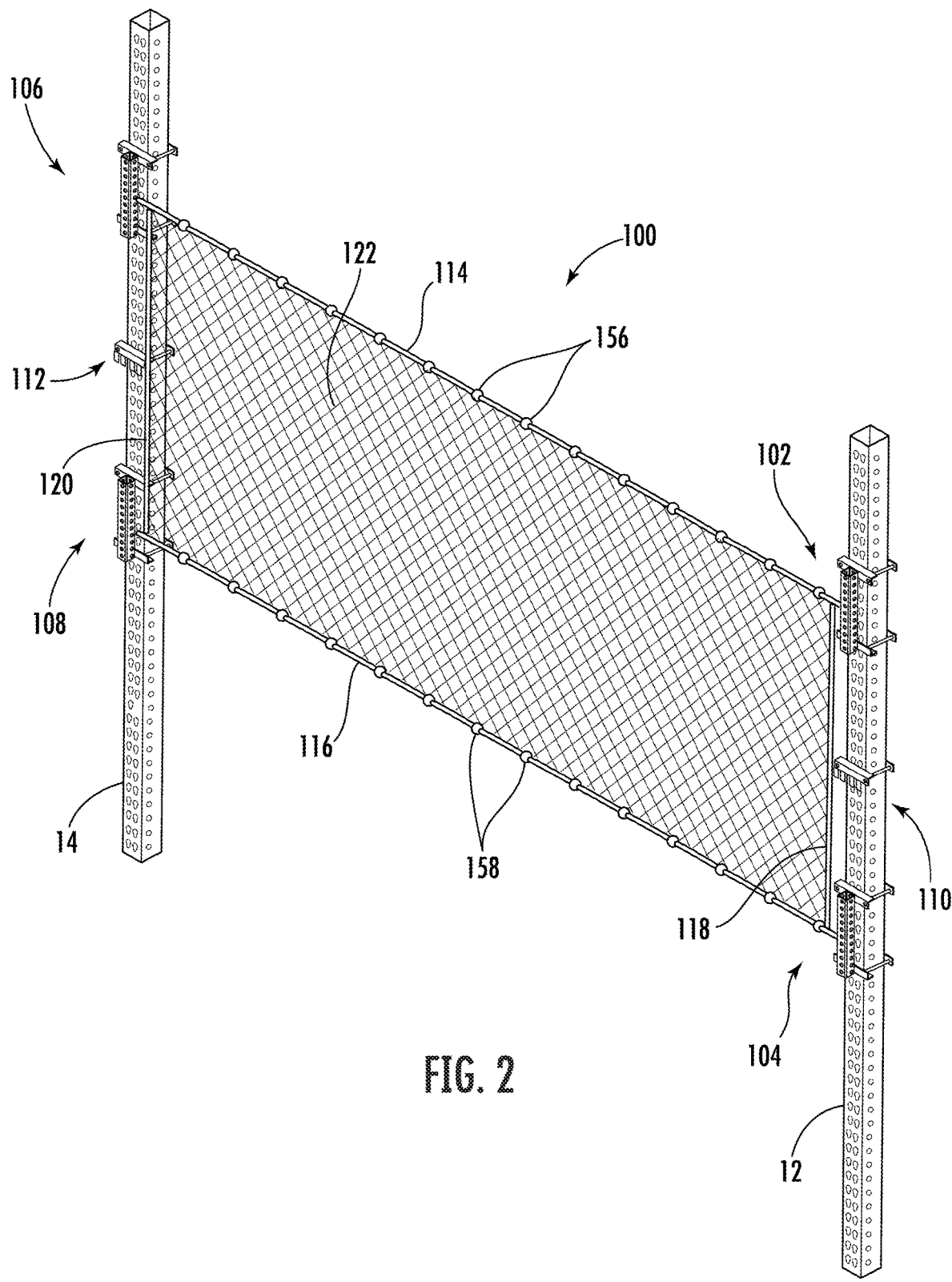
FIG. 2 a perspective view of the safety device of FIG. 1, showing the safety device coupled to the first and second vertical members by a plurality of mounting brackets.

With reference to FIG. 2, the safety device 100 is shown with the first vertical member 12 and the second vertical member 14. The safety device 100 includes a plurality of mounting brackets, e.g., mounting brackets 102-112. The safety device 100 also includes a plurality of guide cables, e.g., a top guide cable 114 and a bottom guide cable 116. The safety device 100 additionally includes a plurality of vertical slide bars, e.g., a right vertical slide bar 118 and a left vertical slide bar 120, and a curtain netting 122. Although shown in the illustrated example as having six (6) mounting bracket (102-112), two (2) guide cables (114, 116), two (2) vertical slide bars (118, 120), and one (1) curtain netting 122, it is contemplated that the safety device can have different numbers of mounting brackets, guide cables, vertical slide bars, and curtain netting, as suitable for preventing objects from falling out a storage rack, e.g., the storage rack 10 (shown in FIG. 1). In certain examples the safety device 100 is a warehouse safety device, e.g., employed at a warehouse. In accordance with certain examples the safety device 100 is distribution center safety device, e.g., employed at a distribution center. It is also contemplated that the safety device 100 can be retail store safety device, e.g., employed at a retail store such as a big-box store, a supercenter, superstore, or a megastore.

Figure 3:
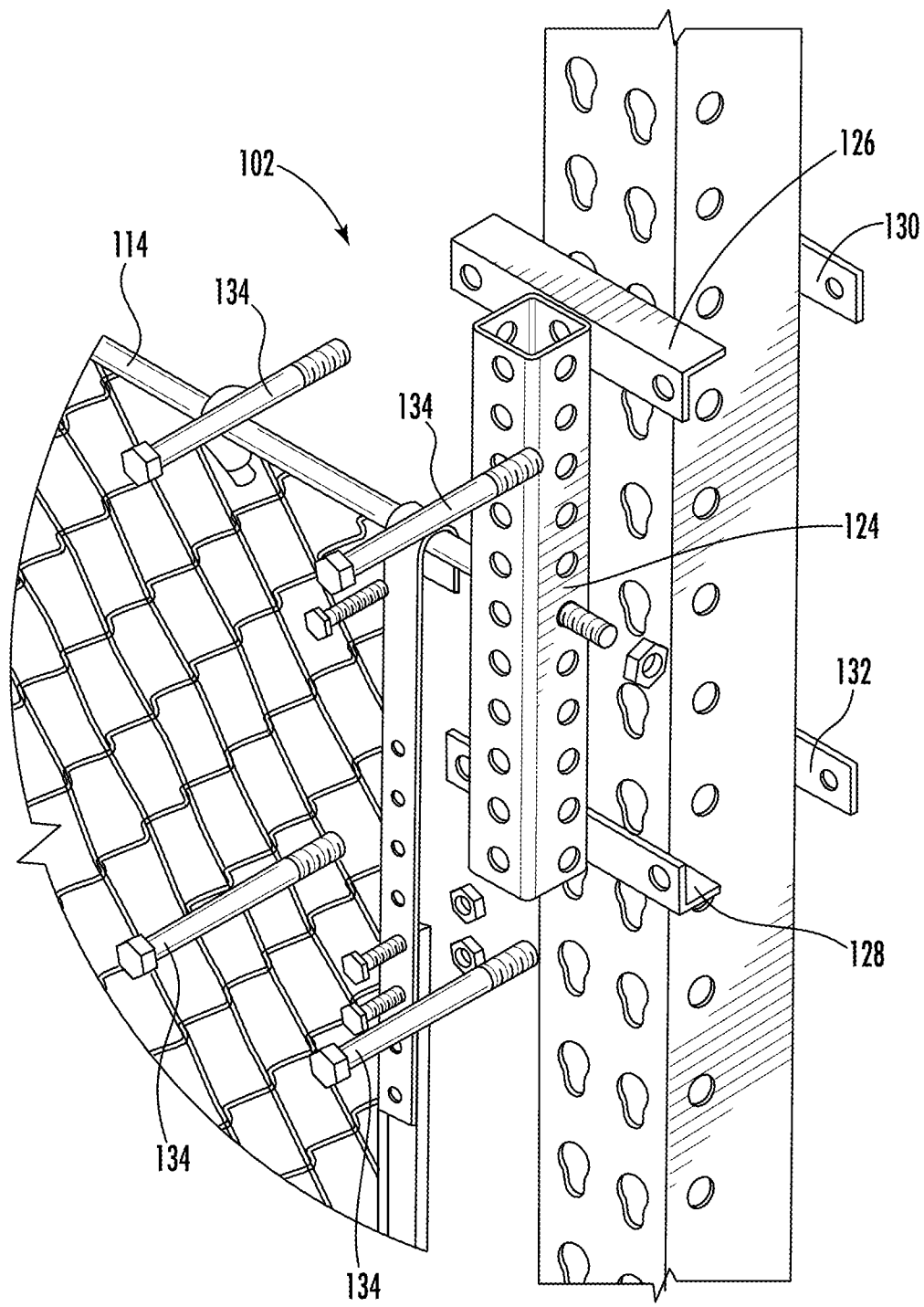
FIG. 3 is a perspective partially exploded view of the one of the mounting brackets of the safety device of FIG. 1, showing a strut receiving a top guide cable and compressively coupled to the first member of the storage rack by a channel and back plates.

With reference to FIGS. 2 and 3, the upper right mounting bracket 102 is shown. The upper right mounting bracket 102 includes a strut 124, an upper channel 126, and a lower channel 128. The upper right mounting bracket 102 also includes an upper back plate 130, a lower back plate 132, and bolts 134.

The strut 124 defines therethrough a plurality of apertures sized to receive therethrough a portion of the top guide cable 114 and has a top portion and a lower portion. The upper channel 126 is connected to the top portion of the strut 124, e.g., via a weld or fastener, and the lower channel 128 is connected to the lower portion of the strut 124. An upper bolt pair of the bolts 134 couple the upper channel 126 to the upper back plate 130 and a lower bolt pair of the bolts 134 couple the lower channel 128 to the lower back plate 132. The first vertical member 12 compressively fixed between the upper channel 126 and upper back plate 130 as well as between the lower channel 128 and the lower back plate 132, the upper right mounting bracket 102 thereby being coupled to the first vertical member 12.

As shown in FIG. 2, the lower right mounting bracket 104 is similar to the upper right mounting bracket 102, is further coupled to the first vertical member 12 at a location below the upper right mounting bracket 102, and additionally receives therethrough the bottom guide cable 116. The upper left mounting bracket 106 is similar to the upper right mounting bracket 102, is further coupled to the second vertical member 14 at a location horizontally opposite the upper right mounting bracket 102, and additionally receives therethrough a portion of the top guide cable 114 longitudinally opposite the portion of the top guide cable 114 received through the upper right mounting bracket 102 such that the top guide cable 114 is stretched between the upper right mounting bracket 102 and the upper left mounting bracket 106.

The lower left mounting bracket 108 is similar to the upper right mounting bracket 102, is further coupled to the second vertical member 14 at a location horizontally opposite the lower right mounting bracket 104, and additionally receives therethrough a portion of the bottom guide cable 116 longitudinally opposite a portion of the bottom guide cable 116 received within the lower right mounting bracket 104. As above, the bottom guide cable 116 is thereby stretched between the lower right mounting bracket 104 and the lower left mounting bracket 108 at a position on the storage rack 10 (shown in FIG. 1) below the top guide cable 114.

Figure 4:
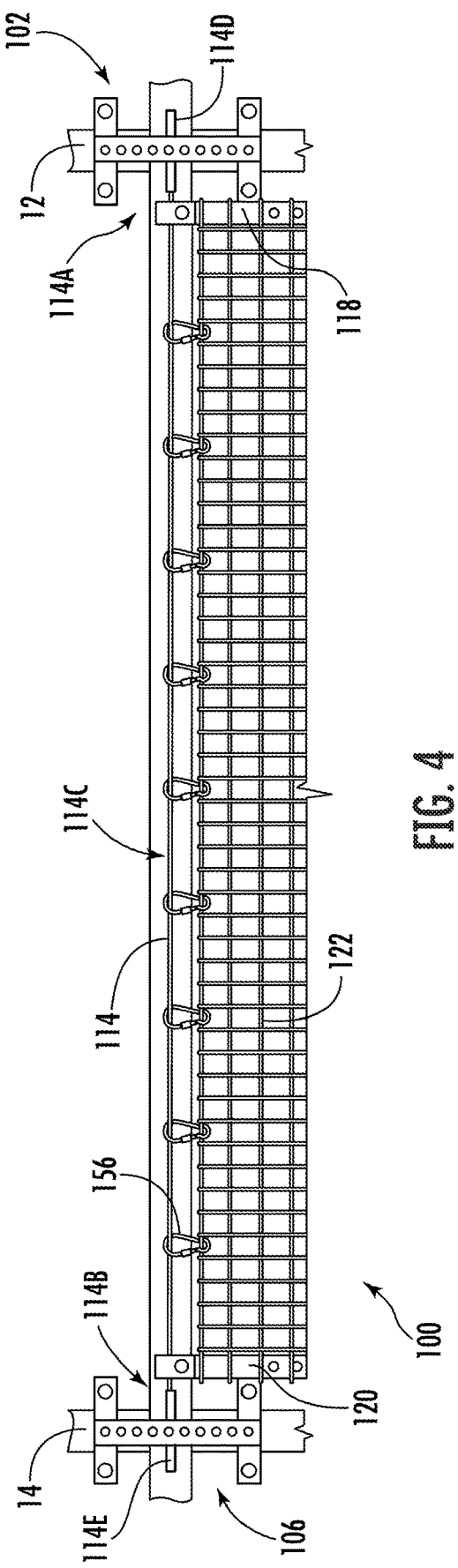
FIG. 4 is a partial front view of the safety device of FIG. 1, showing the top guide cable stretched between right and left upper mounting brackets and slidably supporting a curtain netting with a plurality of carabiners.

With reference to FIGS. 2 and 4, the top guide cable 114 is shown. The top guide cable 114 is stretched between the upper right mounting bracket 102 and the upper left mounting bracket 106 by loading the top guide cable 114 with a tensile load. In this respect the top guide cable has a right threaded segment 114A, a left threaded segment 114B longitudinally opposite the right threaded segment 114A, and an intermediate carabiner-receiving segment 114C. The carabiner-receiving segment 114C of the top guide cable 114 couples the right threaded segment 114A of the top guide cable 114 to the left threaded segment 114B of the top guide cable 114. The right threaded segment 114A of the top guide cable 114 is in turn coupled the first vertical member 12 by the upper right mounting bracket 102, the left threaded segment 114B of the top guide cable 114 is coupled to the second vertical member 14 by the upper left mounting bracket 106, and the carabiner-receiving segment 114C extends between the first vertical member 12 and the second vertical member 14 to support the right vertical slide bar 118, the left vertical slide bar 120, and the curtain netting 122.

Tensile loading of the top guide cable 114 is accomplished by cooperation of a bolt 114D and a bolt 114E. In this respect the bolt 114D is threadably seated on the right threaded segment 114A on a side of the upper right mounting bracket 102 opposite the carabiner-receiving segment 114C, the bolt 114E is threadedly seated on the left threaded segment 114B of the top guide cable 114 on a side of the upper left mounting bracket 106, and the top guide cable 114 loaded in tension by tightening of either (or both) the bolt 114D and the bolt 114E. It is contemplated that the tensile loading of the top guide cable 114 be selected such that the top guide cable 114 transfers the load of each of the curtain netting 122, the right vertical slide bar 118, and the left vertical slide bar 120 to the storage rack 10 (shown in FIG. 1).

As shown in FIG. 2, the bottom guide cable 116 is similar to the top guide cable 114 and is additionally stretched between the lower right mounting bracket 104 and the lower left mounting bracket 108. In this respect the bottom guide cable 116 is fixed to the storage rack 10 (shown in FIG. 1) at a location below the top guide cable 114 to retain the right vertical slide bar 118, the left vertical slide bar 120, and the curtain netting 122 vertically on storage rack 10 and at a position in front of the bay 24 (shown in FIG. 1) in the storage rack 10.

Figure 5:
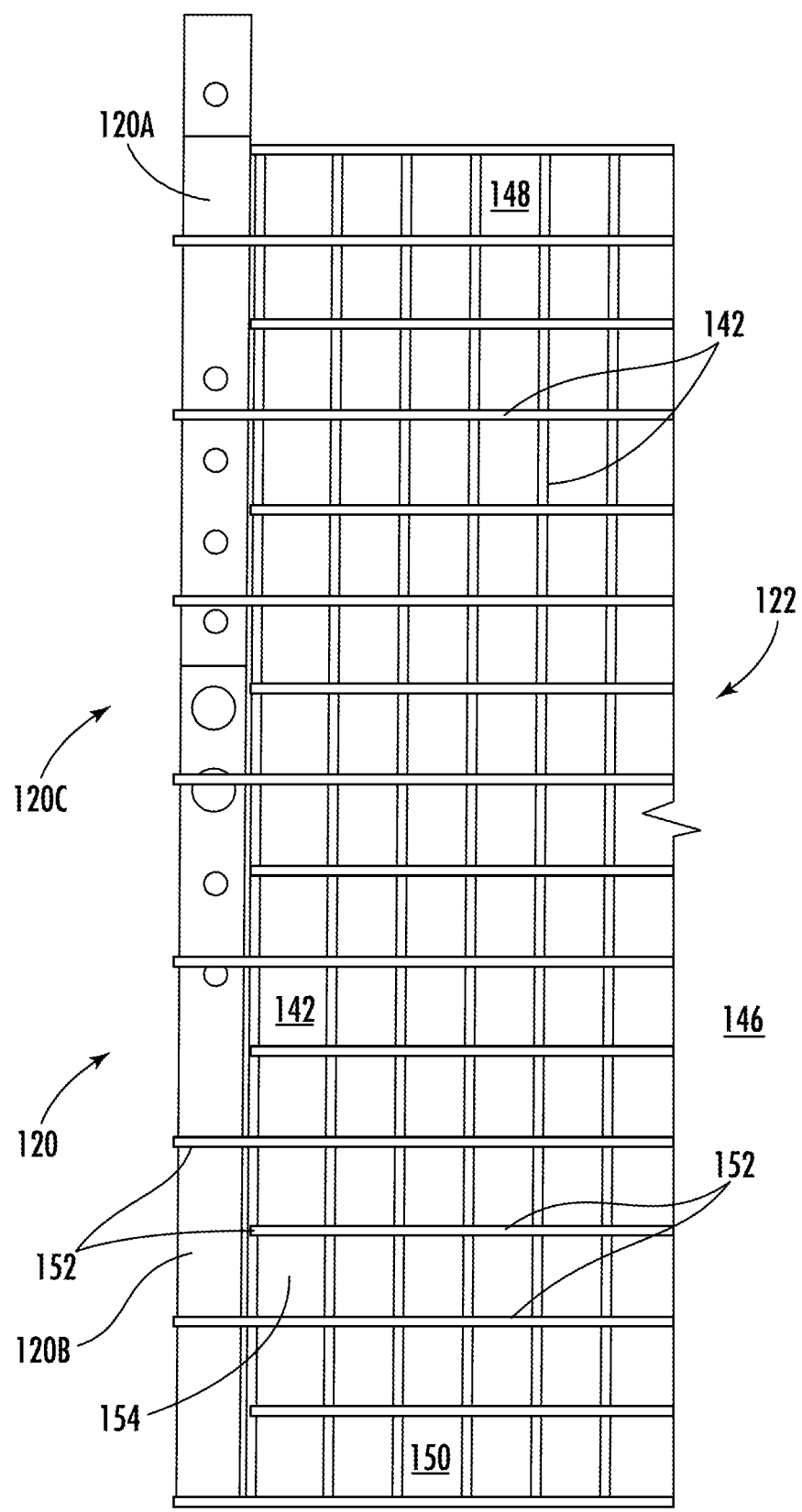
FIG. 5 is a partial front view of the safety device of FIG. 1, showing the curtain netting weaved onto a left slide bar of the safety device.
Figure 6:
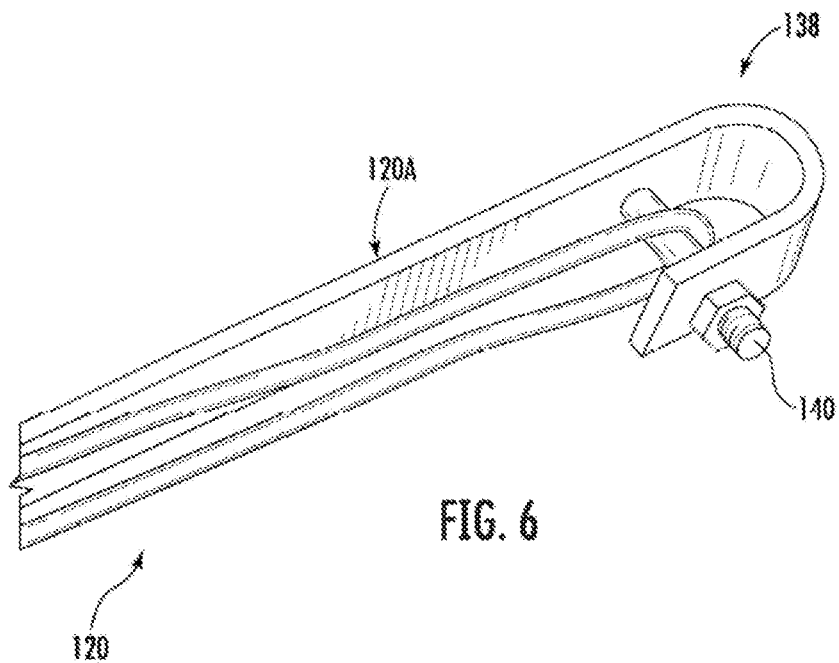
FIG. 6 is a perspective view of a portion of the vertical slide bar of FIG. 5, showing a hooked section for attaching the vertical slide bar to the top guide cable of the safety device.

Referring now to FIGS. 2, 5 and 6, portions of the left vertical slide bar 120 are shown. As shown in FIG. 2, the left vertical slide bar 120 extends vertically between the top guide cable 114 and the bottom guide cable 116 and includes a plurality of segments. In this respect, and as shown in FIG. 5, the left vertical slide bar 120 includes an upper hooked section 120A, a lower hooked section 120B, and a joint 120C.

As shown in FIG. 5, the upper hooked section 120A is formed as an upper bar and the lower hooked section 120B is formed as a lower bar. The joint 120C couples the upper hooked section 120A of the left vertical slide bar 120 to the lower hooked section 120B of the left vertical slide bar 120. So coupled the upper hooked section 120A and the lower hooked section 120B move as a unit horizontally along the top guide cable 114 and the bottom guide cable 116. The joint 102 also renders the lower bar separable from the upper bar for adjusting a length of the left vertical slide bar 120 to fit different-sized storage rack openings, e.g., using bolts positioned in overlaying apertures defined by the upper and lower bars on a common pitch.

As shown in FIG. 6, the upper hooked section 120A has a hooked profile 138 spanned by a keeper 140, e.g., a bolt. It is contemplated that the top guide cable 114 be slidably received within the hooked profile 138 and vertically confined therein by the keeper 140. The hooked profile 138 and the keeper 140 cooperate to allow the left vertical slide bar 120 to slide horizontally along the top guide cable 114 (shown FIG. 2) between the first vertical member 12 (shown in FIG. 1) and the second vertical member 14 (shown in FIG. 1) while limited vertical displacement of the left vertical slide bar 120 relative to the top guide cable 114.

The lower hooked section 120B is similar to the upper hooked section 120A and is additionally slidably disposed on the bottom guide cable 116 (shown in FIG. 2). It is contemplated that the lower hooked section 120B restrain the left vertical slide bar 120 vertically relative to the bottom guide cable 116, limiting skew of the left vertical slide bar 120 relative to the shelves of storage rack 10 (shown in FIG. 1), e.g., relative to the first shelf 20 (shown in FIG. 1) and the second shelf 22 (shown in FIG. 1). The right vertical slide bar 118 (shown in FIG. 2) is similar to the left vertical slide bar 120 and is additionally arranged along the top guide cable 114 and bottom guide cable 116 at a location horizontally between the left vertical slide bar 120 and the first vertical member 12.

With continuing reference to FIG. 5, the curtain netting 122 includes a mesh body 142 and is bounded by a left edge 144, a horizontally opposite right edge 146, a top edge 148 extending between the left edge 144 and the right edge 146, and a bottom edge 150 vertically opposite the top edge 148 and extending between the left edge 144 and the right edge 146 of the curtain netting 122. The mesh body 142 includes a plurality of flexible strands 152 defining therebetween apertures 154. A plurality of top carabiners 156 (shown in FIG. 2) couple the top edge 148 of the curtain netting 122 to the top guide cable 114 such that the top guide cable 114 slidably supports the curtain netting 122 at a location in front of the bay 24 (shown in FIG. 1). A plurality of bottom carabiners 158 (shown in FIG. 2) slidably fix the bottom edge 150 of the curtain netting 122 to the bottom guide cable 116 at a location in front of the bay 24. In this respect the curtain netting 122 is supported by the top guide cable 114 and restrained in vertical position by the bottom guide cable 116.

The curtain netting 122 is weaved over the left vertical slide bar 120. In this respect the left vertical slide bar 120 extends through vertically adjacent apertures 154 defined along the right edge 146 of the curtain netting 122 such that vertically adjacent strands 152 of the curtain netting 122 are disposed on opposite surfaces of the left vertical slide bar 120. The curtain netting 122 is similarly weaved onto the right vertical slide bar 118 (shown in FIG. 2), the weaving of the curtain netting onto the left vertical slide bar 120 and the right vertical slide bar 118 allowing the curtain netting 122 to move horizontally according to user manipulation of the left vertical slide bar 120 and/or the right vertical slide bar 118 while the weight the curtain netting 122, as well as that of the left vertical slide bar 120 and the right vertical slide bar 118, is carried by the top guide cable 114 throughout the horizontal movement range of the curtain netting 122.

As shown in FIG. 2, the right vertical slide bar 118 (shown in FIG. 2) is similar to the left vertical slide bar 120 and is additionally disposed along the top guide cable 114 and the bottom guide cable 116 at position horizontally between the left vertical slide bar 120 and the first vertical member 12. The right edge 146 of the curtain netting 122 is weaved over the right vertical slide bar 118, the right vertical slide bar 118 extending through vertically adjacent apertures 154 defined along the left edge 144 of the curtain netting 122 such that vertically adjacent strands of the mesh body 122 are disposed on opposite surfaces of the right vertical slide bar 118. As will be appreciated by those of skill in the art in view of the present disclosure, the right edge 146 of the curtain netting 122 is thereby further carried by the right vertical slide bar 118 while supported by the top guide cable 114 and vertically fixed by the bottom guide cable 116.

Figure 7:
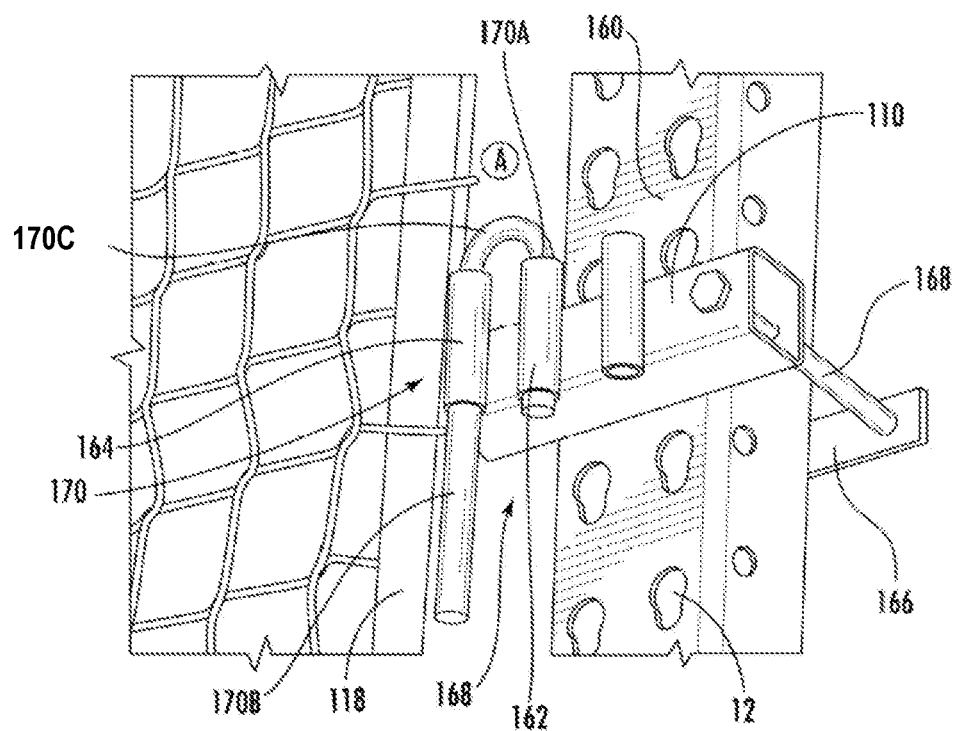
FIGS. 7 and 8 are a partial perspective views of the safety device of FIG. 1, showing an intermediate mounting bracket and a J-hook in a first position, wherein the curtain netting is fixed relative to the first vertical member, and the J-hook in a second position, wherein the curtain netting is free relative to the first vertical member of the storage rack, respectively.
Figure 8:
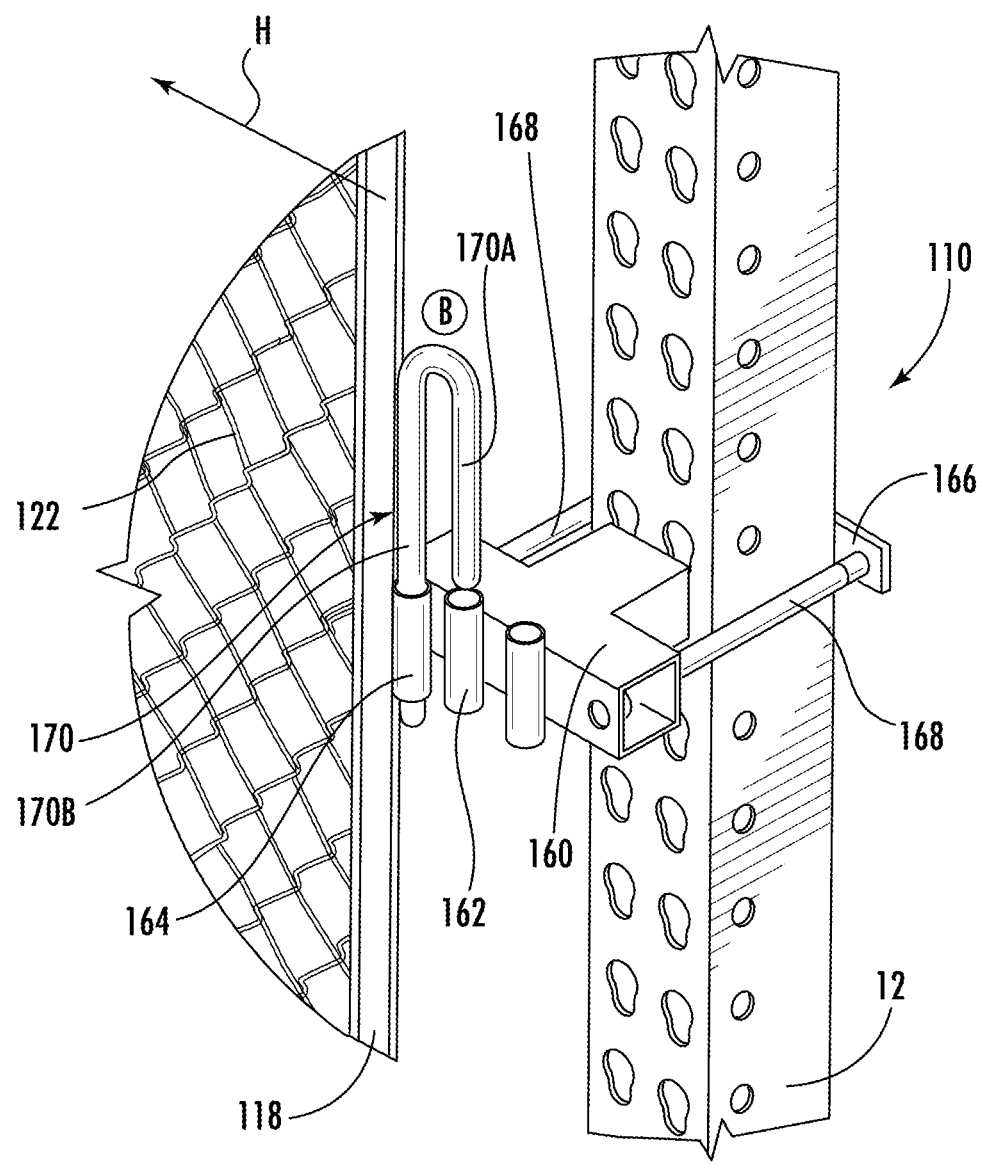

Referring now to FIGS. 2, 7 and 8, the right intermediate mounting bracket 110 is shown. The right intermediate mounting bracket 110 is configured to removably fix the right vertical slide bar 118 to the first vertical member 12. In this respect the right intermediate mounting bracket 110 is coupled to the first vertical member 12 at a location vertically intermediate, i.e., between, the upper right mounting bracket 102 and the lower right mounting bracket 104. In the illustrated example the right intermediate mounting bracket 110 includes a horizontal strut 160, a first tube 162, and a second tube 164. The right intermediate mounting bracket 110 also includes a back plate 166 and bolts 168, and cooperates with a J-hook 170.

The J-hook 170 has a terminal end 170A, a shank 170B, and a split annulus 170C. The terminal end 170A is configured to be removably received within the first tube 162. The shank 170B extends from the terminal end 170A and is configured to be slidably received within the second tube 164. The split annulus 170C is seated in an end of the shank 170B opposite the terminal end 170A to slidably fix the shank 170B of the J-hook 170 within the second tube 164. As will be appreciated by those of skill in the art in view of the present disclosure, the circular shape split annulus 170C allows the split annulus 170C to slidably retain the shank 170B within the second tube 164 while limiting (or eliminating entirely) risk the curtain netting from become snagged on the shank 170B of the J-hook 170.

The first tube 162 is fixed to the horizontal strut 160, e.g., with a weld or fastener, extends vertically along the first vertical member 12, and is configured to seat therein the terminal end 170A of the J-hook 170. The horizontal strut 160 horizontally spans the first vertical member 12 and receives therethrough, at horizontally opposite ends, the bolts 168. The bolts 168 each extend through both the horizontal strut 160 and the back plate 166, receive thereon fasteners, and compressively embrace between one another the first vertical member 12. The compressive engagement of the horizontal strut 160 and the back plate 166 against the first vertical member 12 couples the right intermediate mounting bracket 110 to the first vertical member 12 of the storage rack 10 (shown in FIG. 1). The second tube 164 is affixed to right vertical slide bar 118, e.g., via a weld or fastener, and is arranged to slidably receive therein the shank 170B of the J-hook 170.

The J-hook 170 is slidably attached to both the first tube 162 and the second tube 164, is received within the second tube 164, and is movable relative to the second tube 164 between a first position A (shown in FIG. 7) and a second position B (shown in FIG. 8). The second position B is offset from the first position A in the vertical direction. It is contemplated that, in the first position A, the terminal end 170A of the J-hook 170 be slidably received within the first tube 162 and attached thereto such that the right vertical slide bar 118 is horizontally fixed relative to the first vertical member 12. As will be appreciated by those of skill in the art in view of the present disclosure, this fixes the right edge 146 (shown in FIG. 5) of the curtain netting 122 to the first vertical member 12. So fixed the curtain netting 122 prevents objects positioned in the bay 24 (shown in FIG. 1) from falling from the storage rack 10 (shown in FIG. 1).

It is also contemplated that, in the second position B, the terminal end 168A of the J-hook 170 be displaced from the first tube 162 (and detached therefrom), the right vertical slide bar 118 being horizontally free relative to the first vertical member 12. As will also be appreciated by those of skill in the art in view of the present disclosure, this allows a user to horizontally slide H the right edge 146 (shown in FIG. 5) of the curtain netting 122 along the top guide cable 114 and bottom guide cable 116 by sliding the right vertical slide bar 118 along the top guide cable 114 and the bottom guide cable 116. Sliding displacement of the right vertical slide bar 118 in turn allows the user to position and/or retrieve objects from the bay 24 (shown in FIG. 1) of the storage rack 10 (shown in FIG. 1).

As shown in FIG. 2, the left intermediate mounting bracket 112 is similar to the right intermediate mounting bracket 110 and is configured to removably fix the left vertical slide bar 120 to the second vertical member 14. In this respect the left intermediate mounting bracket 112 prevents objects from falling from the storage rack 10 by fixing the left edge 144 of the curtain netting 122 to the second vertical member 14 and allows a user to position and/or remove objects from the storage rack 10 by horizontally sliding the left vertical slide bar along the top guide cable 114 and the bottom guide cable 116.

Figure 9:
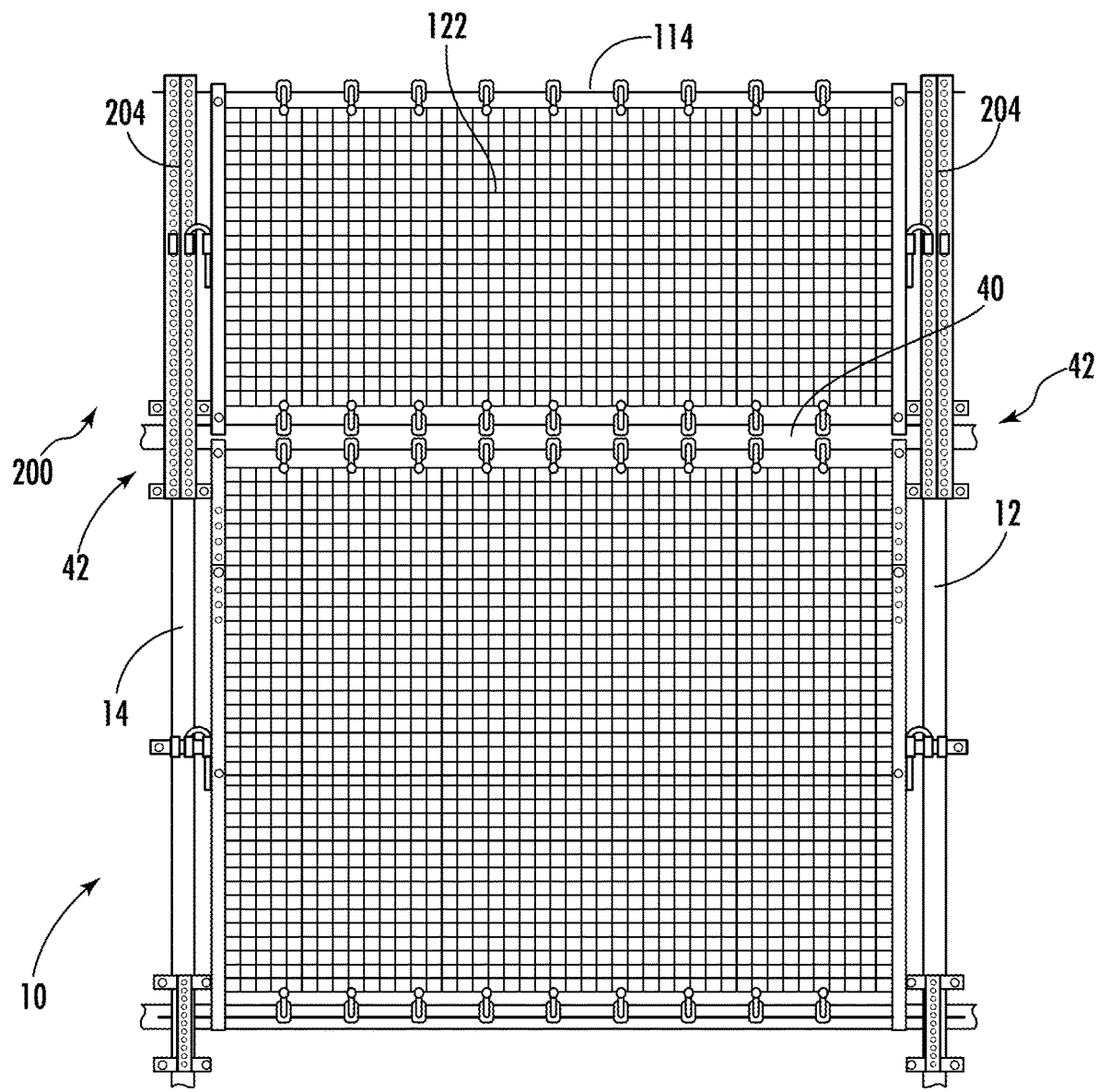
FIG. 9 is a front view of the safety device of FIG. 1 according to another example, showing extensions supporting the top guide cable above terminations of the first and second vertical members of the storage rack to protect objects stored on a top shelf of the storage rack.

With reference to FIG. 9, a safety device 200 is shown. The safety device 200 is similar to the safety device 100 (shown in FIG. 1) and additionally includes a right vertical extension 202 and a left vertical extension 204. The right vertical extension 202 and the left vertical extension 204 support the top guide cable 114 at a position above terminations 42 of the first vertical member 12 and the second vertical member of the storage rack 10. Supporting the top guide cable 114 at a position above the storage rack 10 allows the curtain netting 122 to be supported above the storage rack 10, e.g., above a top shelf 40 of the storage rack 10, to prevent objects stored above the terminations 42 of the first vertical member 12 and the second vertical member 14 from falling from the storage rack 10.

Figure 10:
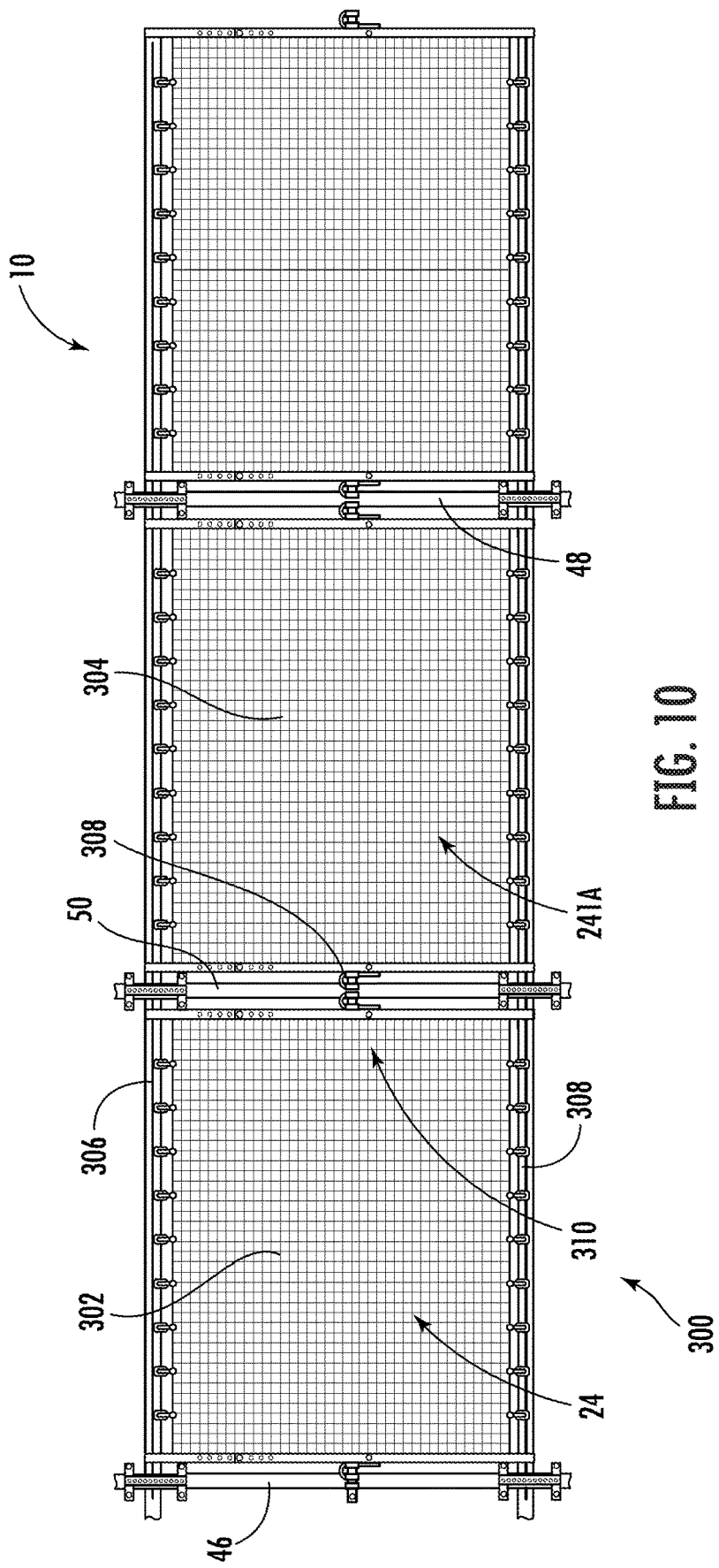
FIG. 10 is a front view of the safety device of FIG. 1 according to a further example, showing first and second curtain nettings of the safety device protecting horizontally adjacent bays of a storage rack.

With reference to FIG. 10, a safety device 300 is shown. The safety device 300 is similar to the safety device 100 (shown in FIG. 1) and is additionally configured to provide horizontally contiguous protection to objects stored in horizontally adjacent bays, e.g., the bay 24 and a horizontally adjacent bay 24A. In this respect the safety device 300 includes a first curtain netting 302 and at least one second curtain netting 304. The first curtain netting 302 is slidably supported in front of the first bay 24 and the second curtain netting 304 is slidably supported in front of a second bay 44 to provide contiguous protection horizontally along a plurality of bays.

In the illustrated example a singular top guide cable 306 and a singular bottom guide cable 308 span both the first bay 24 and the second bay 44. The singular top guide cable 306 and the singular bottom guide cable 308 are in turn coupled at horizontally opposite ends to a first vertical member 46 and the second vertical member 48, while coupled at an intermediate vertical member 50. The first curtain netting 306 is attached to the top guide cable 306 and the bottom guide cable 308, and the second curtain netting 308 is attached to the top guide cable 306 and the bottom guide 308 at a location horizontally spaced apart from the first curtain netting by the intermediate vertical member 50. This allows for uninterrupted rack protection and access to objects positioned on the storage rack 10. In the illustrated example the amount of hardware required is limited by fixation of a third tube 308 to an intermediate mounting member 310, simplifying installation and limiting the number of parts otherwise required for the safety device 300.

Figure 11:
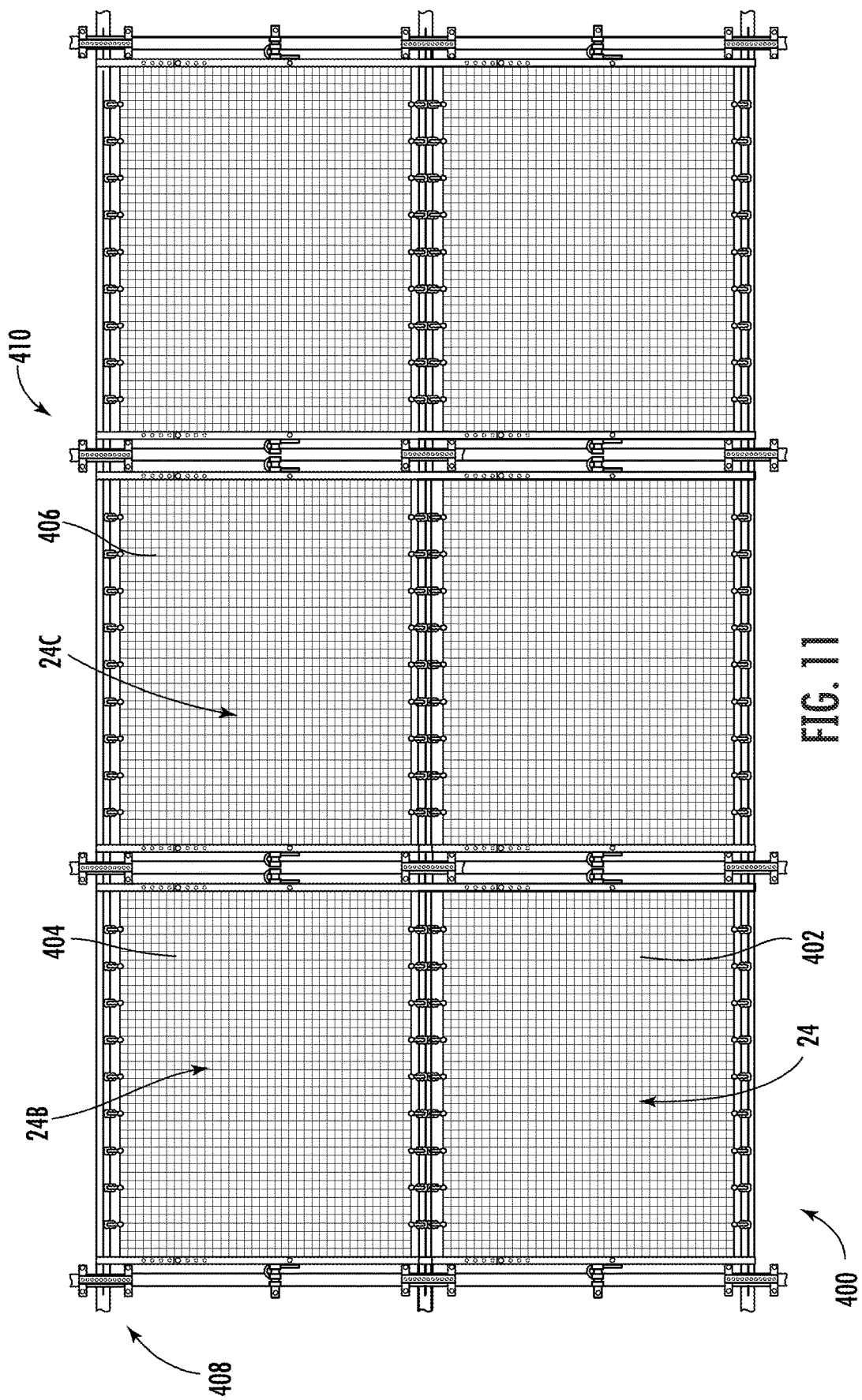
FIG. 11 is a front view of the safety device FIG. 1 according to yet another example, showing first and second curtain nettings of the safety device protecting vertically adjacent bays of the storage rack.

With reference to FIG. 11, a safety device 400 is shown. The safety device 400 is similar to the safety device 100 (shown in FIG. 1) and is additionally configured to provide vertically contiguous protection to objects stored in vertically adjacent bays, e.g., the bay 24 and a vertically bay 24B. In this respect the safety device 400 includes a first curtain netting 402 and a second curtain netting 404. The first curtain netting 402 is supported in front of the first bay 24 and the second curtain netting is supported in front of the second bay 24B, the safety device 400 thereby providing contiguous top-to-bottom protection to objects positioned in both first bay 24 and the second bay 24B.

As shown in FIG. 11 the safety device 400 is configured both horizontally and vertically as a contiguous end-to-end and top-to-bottom installation to cover a horizontally adjacent bay 24C with a third curtain netting 406. In this embodiment incorporation of a top right mounting bracket 408 and the top left mounting bracket 410 enable the safety device 400 to protect both the vertically adjacent bay 24B and the horizontally adjacent bay 24C. This allows for uninterrupted rack protection and material access, and a reduction of redundant hardware for cost and ease of installation.

Figure 12:
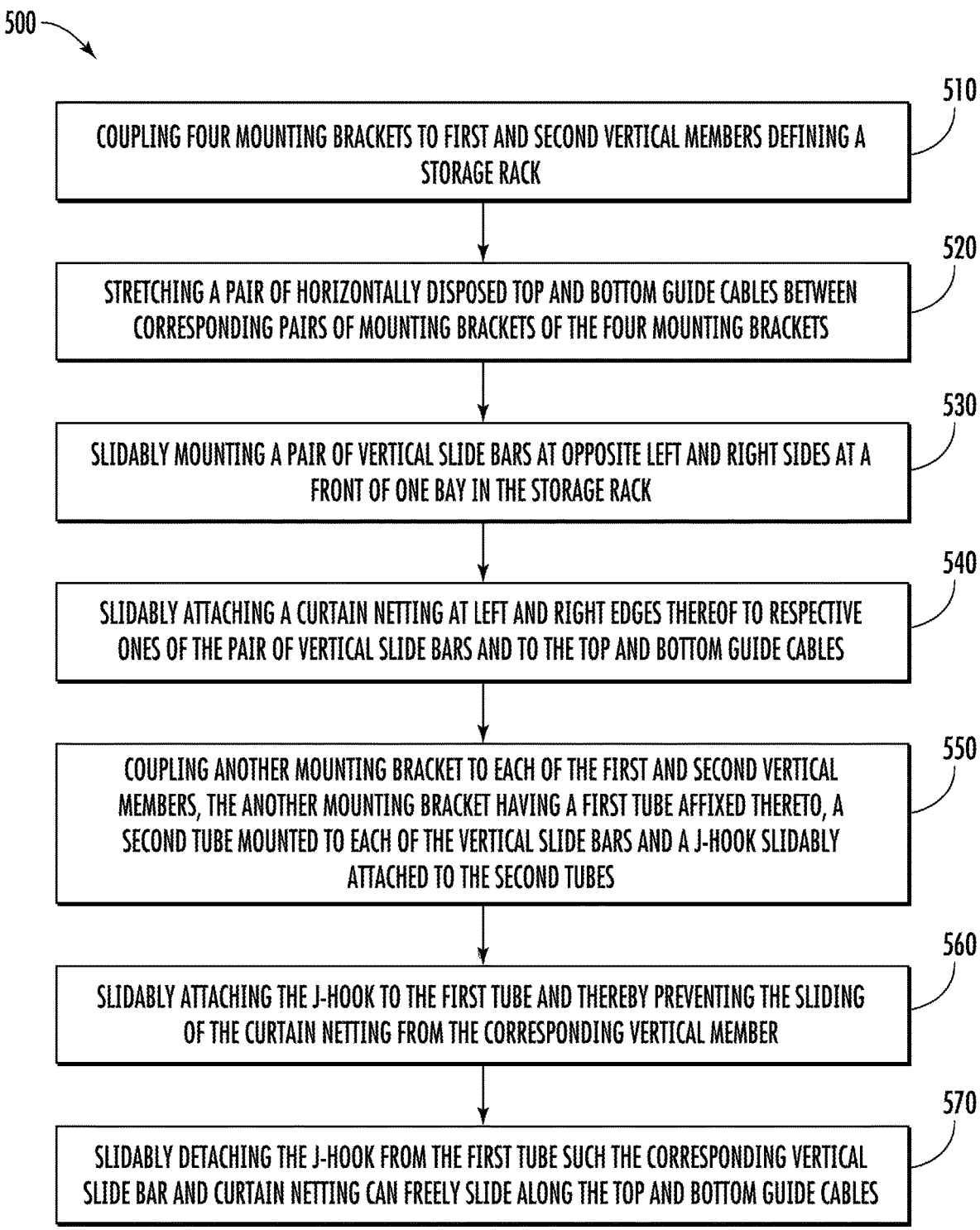
FIG. 12 is a block diagram of a method protecting an object stored on a storage rack, showing steps of the method according to a non-limiting example of the method.

With reference to FIG. 12, a method 500 of protecting objects stored on a storage rack is shown. As shown in block 510, four (4) mounting brackets, e.g., the mounting brackets 102-108 (shown in FIG. 2), are attached to first and second vertical members defining a storage rack, e.g., the first vertical member 12 (shown in FIG. 1) and the second vertical member 14 (shown in FIG. 1). A pair of horizontally disposed top and bottom guide cables, e.g., the top guide cable 114 (shown in FIG. 2) and the bottom guide cable 116 (shown in FIG. 2), as shown with box 520. A pair vertical slide bars, e.g., the left vertical slide bar 120 (shown in FIG. 2) and the right vertical slide bar 118 (shown in FIG. 2), are then slidably mounted at opposite left and right sides at a front of one bay in the storage rack, e.g., the bay 24 (shown in FIG. 1), as shown with box 530. As shown with box 540, a curtain netting, e.g., the curtain netting 128 (shown in FIG. 2), is then slidably attached at left and right edges thereof to respective ones of the pair of vertical slide bars and the top and bottom guide cables. Another mounting bracket is thereafter coupled to each of the first and second vertical members, e.g., the intermediate mounting brackets 110-112 (shown in FIG. 2), the another mounting bracket having a first tube affixed thereto, e.g., the first tube 162 (shown in FIG. 7); a second tube mounted to each of the vertical slide bars, e.g., the second tube 164 (shown in FIG. 7); and a J-hook slidably attached to the second tubes, e.g., the J-hook 170 (shown in FIG. 7), as shown with box 550.

To render an object positioned on the storage rack safe, e.g., the object 26 (shown in FIG. 1), the J-hook is slidably attached to the first tube, as shown with box 560. This prevents sliding (e.g., horizontal movement) of the curtain netting from the corresponding vertical member. To retrieve the object positioned on the storage rack the J-hook is slidably detached from the first tube, as shown with box 570. Detaching the J-hook from the first tube allows the curtain netting to freely slide along the top and bottom guide cables, the object thereby accessible from the front of the bay in the storage rack.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A safety device for preventing objects from falling out of a storage rack, comprising:

four mounting brackets configured to be coupled to an opposing pair of vertical members defining the storage rack;
a pair of horizontally disposed top and bottom guide cables for stretching between a corresponding pair of mounting brackets of the four mounting brackets coupled to the pair of vertical members;
a pair of vertical slide bars for slidably mounting to the top and bottom guide cables at opposite left and right sides at a front of one bay in the storage rack; and
a curtain netting attached at left and right edges thereof to respective ones of the pair of the vertical slide bars and to the top and bottom guide cables, the curtain netting being flexible to be horizontally separated from at least one of the opposing pair of vertical members defining the storage rack to alter a horizontal extension length of the curtain netting to cover less than an entire portion of the front of the one bay in the storage rack,
wherein each of the vertical slide bars comprises two separable bars for adjusting a length of each of the vertical slide bars to fit different-sized storage rack openings.

2. The safety device of claim 1, wherein:
the curtain netting is attached to the top and bottom guide cables via carabiners while left and right edges defining the curtain netting are weaved onto respective vertical slide bars of the pair of vertical slide bars for a sliding curtain-hanger attachment between the top and bottom guide cables such that the curtain netting can be horizontally separated from each of the opposing pair of vertical members defining the storage rack.

3. The safety device of claim 2, wherein:
the curtain netting is weaved onto each of the pair of vertical slide bars by weaving an entire cross section defining the corresponding vertical slide bar through every other mesh defining the curtain netting along at least a substantial length defining each of the pair of vertical slide bars extending between the top and bottom guide cables.

4. The safety device of claim 2, wherein:
each of the vertical slide bars terminates in a hooked section for coupling to the top and bottom guide cables.

5. The safety device of claim 1, further comprising:
another mounting bracket configured to be coupled to each of the pair of vertical members defining the storage rack, the another mounting bracket having a first tube affixed thereto;
a second tube mounted to each of the vertical slide bars; and
a J-hook slidably attachable to both the first and second tubes to prevent sliding of the curtain netting from the corresponding vertical member defining the storage rack.

6. The safety device of claim 1, wherein:
when the J-hook is detached from the first tube, the corresponding vertical slide bar and curtain netting can freely slide along the top and bottom guide cables.

7. The safety device of claim 1, wherein the J-hook comprises:
a terminal end configured to be received within the first tube;
a shank extending from the terminal end and configured to be slidably received within the second tube; and
a split annulus seated in the shank and slidably fixing the shank of the J-hook within the second tube.

8. The safety device of claim 1, further comprising a pair of vertical extensions extending from an upper pair of the four mounting brackets to support the top guide cable at a location above terminations of the pair of vertical members of the storage rack.

9. The safety device of claim 1, wherein the curtain netting is a first curtain netting and further comprising a second curtain netting, wherein the second curtain netting is attached to the top and bottom guide cables and is horizontally spaced apart from the first curtain netting by a vertical member between each vertical member of the pair of vertical members of the storage rack.

10. The safety device of claim 1, wherein the curtain netting is a first curtain netting and further comprising:
another pair of mounting brackets configured to be coupled to a pair of vertical members defining the storage rack vertically between the four mounting brackets;
an upper pair of horizontally disposed top and bottom guide cables for stretching between a corresponding pair of mounting brackets of the another pair of mounting brackets coupled to the pair of vertical members;
an upper pair of vertical slide bars for slidably mounting to the upper top and bottom guide cables at opposite left and right sides at a front of one bay in the storage rack; and
a second curtain netting attached at left and right edges thereof to respective ones of the upper pair of the vertical slide bars and to the upper top and bottom guide cables.

11. The safety device of claim 1, wherein the safety device is one of a warehouse safety device, a distribution center safety device, and retail safety device.

12. A storage rack, comprising:
a first vertical member;
a second vertical member horizontally spaced from the first vertical member defining an opposing pair of opposing vertical members;
a shelf coupling the second vertical member to the first vertical member to define one bay in the storage rack; and
a safety device, comprising:
four mounting brackets coupled to the first vertical member and the second vertical member;
a pair of horizontally disposed top and bottom guide cables stretched between pairs of mounting brackets of the four mounting brackets coupled to the first and second vertical members;
a pair of vertical slide bars slidably mounted to the top and bottom guide cables at opposite left and right sides at a front of the one bay in the storage rack; and
a curtain netting attached at left and right edges thereof to respective ones of the pair of the vertical slide bars and to the top and bottom guide cables, the curtain netting being flexible to be horizontally separated from at least one of the opposing pair of vertical members defining the storage rack to alter a horizontal extension length of the curtain netting to cover less than an entire portion of the front of the one bay in the storage rack,
wherein each of the vertical slide bars comprises two separable bars for adjusting a length of each of the vertical slide bars to fit different-sized storage rack openings.

13. The storage rack of claim 12, wherein:
the curtain netting of the safety device is attached to the top and bottom guide cables via carabiners while left and right edges defining the curtain netting are weaved onto respective vertical slide bars of the pair of vertical slide bars for a sliding curtain-hanger attachment between the top and bottom guide cables such that the curtain netting can be horizontally separated from each of the opposing pair of vertical members defining the storage rack.

14. The storage rack of claim 13, wherein:
the curtain netting of the safety device is weaved onto each of the pair of vertical slide bars by weaving an entire cross section defining the corresponding vertical slide bar through every other mesh defining the curtain netting along at least a substantial length defining each of the pair of vertical slide bars extending between the top and bottom guide cables.

15. The storage rack of claim 13, wherein:
each of the vertical slide bars of the safety device terminates in a hooked section for coupling to the top and bottom guide cables.

16. The storage rack of claim 12, wherein the safety device further comprises:
another mounting bracket coupled to each of the first vertical member and the second vertical member, the another mounting bracket having a first tube affixed thereto;
a second tube mounted to each of the vertical slide bars; and
a J-hook slidably attachable to both the first and second tubes to prevent sliding of the curtain netting from the corresponding vertical member defining the storage rack,
the J-hook preventing sliding of the curtain netting from the corresponding vertical member defining the storage rack when attached to the first tube,
the corresponding vertical slide bar and curtain netting freely slidable along the top and bottom guide cables when the J-hook of the safety device is detached from the first tube.

17. A method of protecting objects stored on a storage rack, comprising:
at a storage rack comprising a first vertical member, a second vertical member horizontally spaced from the first vertical member, and a shelf coupling the second vertical member to the first vertical member to define one bay in the storage rack,
coupling four mounting brackets to the first and second vertical members;
stretching a pair of horizontally disposed top and bottom guide cables between corresponding pairs of mounting brackets of the four mounting brackets;
slidably mounting a pair of vertical slide bars at opposite left and right sides at a front of one bay in the storage rack; and
slidably attaching a curtain netting at left and right edges thereof to respective ones of the pair of vertical slide bars and to the top and bottom guide cables,
wherein the curtain netting is flexible to be horizontally separated from at least one of an opposing pair of vertical members defining the storage rack to alter a horizontal extension length of the curtain netting to cover less than an entire portion of the front of the one bay in the storage rack, and
wherein each of the vertical slide bars comprises two separable bars for adjusting a length of each of the vertical slide bars to fit different-sized storage rack openings.

18. The method of claim 17, further comprising:
coupling another mounting bracket to each of the first and second vertical members, the another mounting bracket having a first tube affixed thereto, a second tube mounted to each of the vertical slide bars and a J-hook slidably attached to the second tubes;
slidably attaching the J-hook to the first tube and thereby preventing the sliding of the curtain netting from the corresponding vertical member defining the storage rack; and
slidably detaching the J-hook from the first tube such the corresponding vertical slide bar and curtain netting can freely slide along the top and bottom guide cables.

19. The method of claim 17, further comprising:
attaching the curtain netting of the safety device to the top and bottom guide cables while left and right edges defining the curtain netting are weaved onto respective vertical slide bars of the pair of vertical slide bars for a sliding curtain-hanger attachment between the top and bottom guide cables such that the curtain netting can be horizontally separated from each of the opposing pair of vertical members defining the storage rack,
wherein the curtain netting of the safety device is weaved onto each of the pair of vertical slide bars by weaving an entire cross section defining the corresponding vertical slide bar through every other mesh defining the curtain netting along at least a substantial length defining each of the pair of vertical slide bars extending between the top and bottom guide cables.

* * * * *